(12) United States Patent
Mao et al.

(10) Patent No.: US 10,528,710 B2
(45) Date of Patent: Jan. 7, 2020

(54) SYSTEM AND METHOD FOR USER IDENTITY VERIFICATION, AND CLIENT AND SERVER BY USE THEREOF

(71) Applicant: Alibaba Group Holding Limited, George Town, Grand Cayman (KY)

(72) Inventors: Renxin Mao, Hangzhou (CN); Hongwei Gan, Hangzhou (CN); Cuiping Huang, Hangzhou (CN); Dijun He, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 249 days.

(21) Appl. No.: 15/041,856

(22) Filed: Feb. 11, 2016

(65) Prior Publication Data
US 2016/0239650 A1 Aug. 18, 2016

(30) Foreign Application Priority Data

Feb. 15, 2015 (CN) .......................... 2015 1 0082444

(51) Int. Cl.
*G06F 21/31* (2013.01)
(52) U.S. Cl.
CPC ................................... *G06F 21/31* (2013.01)
(58) Field of Classification Search
CPC .......................... G06F 21/31; G06F 2221/2103
(Continued)

(56) References Cited

U.S. PATENT DOCUMENTS

| 5,442,342 A * | 8/1995 | Kung ...................... G06F 21/34 |
| | | 235/382 |
| 6,862,610 B2 | 3/2005 | Shuster |

(Continued)

FOREIGN PATENT DOCUMENTS

| CN | 103138921 A | 6/2013 |
| CN | 103812822 A | 5/2014 |

(Continued)

OTHER PUBLICATIONS

Karapanos, "Sound-Proof: Usable Two-Factor Authentication Based on Ambient Sound", Aug. 2015, USENIX, pp. 483-498 (Year: 2015).*

*Primary Examiner* — Kenneth W Chang
*Assistant Examiner* — Gregory A Lane

(57) ABSTRACT

A method of user identity verification by a server, where the server pre-configures, by use of collected user information, verification information corresponding to accounts of users in a user verification information data store, the verification information including a plurality of verification security challenges and a plurality of respective first verification answers. The method includes detecting a condition to whether initiate a user identity verification is satisfied, where an account ID of a user is obtained from the condition. The method also includes inquiring the pre-configured user verification information about verification information matching the account ID and transmitting security challenges of the inquired verification information to the client. The method further includes receiving from the client second verification answers corresponding to the security challenges and comparing the second verification answers with the first verification answers to determine whether the user's identity is verified.

24 Claims, 8 Drawing Sheets

(58) Field of Classification Search
USPC .......................................................... 726/16
See application file for complete search history.

(56) References Cited

U.S. PATENT DOCUMENTS

| | | | |
|---|---|---|---|
| 7,548,890 B2 | 6/2009 | Shakkarwar | |
| 7,765,588 B2 | 7/2010 | Sahota et al. | |
| 7,929,951 B2 | 4/2011 | Stevens | |
| 8,150,772 B2 | 4/2012 | Mardikar et al. | |
| 8,161,534 B2 | 4/2012 | Golle et al. | |
| 8,285,648 B2 | 10/2012 | Goodin | |
| 8,296,245 B2 | 10/2012 | Barber et al. | |
| 8,320,540 B2 | 11/2012 | Chen | |
| 8,464,324 B2 | 6/2013 | Mechaley, Jr. | |
| 8,483,518 B2 | 7/2013 | Zhu et al. | |
| 8,527,758 B2 | 9/2013 | Mansour | |
| 8,554,689 B2 | 10/2013 | Mardikar et al. | |
| 8,605,296 B2 | 12/2013 | Fry et al. | |
| 8,682,698 B2 | 3/2014 | Cashman et al. | |
| 8,683,557 B1 | 3/2014 | Desikan et al. | |
| 8,726,355 B2 | 5/2014 | Shuster | |
| 8,756,661 B2 | 6/2014 | Levenberg | |
| 8,784,197 B2 | 7/2014 | Alderucci et al. | |
| 8,799,088 B2 | 8/2014 | Rothschild | |
| 8,832,809 B2 | 9/2014 | Paulsen et al. | |
| 8,838,990 B2 | 9/2014 | Boult et al. | |
| 8,844,005 B2 | 9/2014 | Jakobsson et al. | |
| 8,881,251 B1 | 11/2014 | Hilger | |
| 8,892,697 B2 | 11/2014 | Nema | |
| 8,918,904 B2 | 12/2014 | Sanin et al. | |
| 8,930,709 B2 | 1/2015 | Navratil et al. | |
| 8,942,433 B2 | 1/2015 | Small | |
| 9,002,018 B2 | 4/2015 | Wilkins et al. | |
| 9,038,146 B1 | 5/2015 | Desikan et al. | |
| 9,065,816 B2 | 6/2015 | Pollock | |
| 9,112,852 B2 | 8/2015 | Zhu et al. | |
| 9,122,866 B1* | 9/2015 | Kolman | G06F 21/46 |
| 9,185,098 B2 | 11/2015 | Harik et al. | |
| 9,197,648 B2 | 11/2015 | Mogush | |
| 9,208,492 B2 | 12/2015 | Hoyos | |
| 9,231,937 B2 | 1/2016 | Cao | |
| 9,262,422 B1 | 2/2016 | Daniel | |
| 2004/0088587 A1 | 5/2004 | Ramaswammy et al. | |
| 2004/0172535 A1* | 9/2004 | Jakobsson | G06Q 20/341 |
| | | | 713/168 |
| 2007/0078668 A1 | 4/2007 | Pathria et al. | |
| 2007/0282610 A1* | 12/2007 | Luss | G06F 21/31 |
| | | | 704/273 |
| 2007/0283416 A1* | 12/2007 | Renaud | G06F 21/31 |
| | | | 726/2 |
| 2008/0066165 A1* | 3/2008 | Rosenoer | G06F 17/30569 |
| | | | 726/5 |
| 2008/0222722 A1 | 9/2008 | Navratil et al. | |
| 2009/0289760 A1* | 11/2009 | Murakami | G06K 9/00885 |
| | | | 340/5.82 |
| 2010/0131409 A1 | 5/2010 | Lawyer et al. | |
| 2010/0274478 A1 | 10/2010 | Takahashi | |
| 2011/0093938 A1* | 4/2011 | Asokan | G06F 21/31 |
| | | | 726/7 |
| 2012/0079576 A1* | 3/2012 | Han | G06F 21/316 |
| | | | 726/7 |
| 2013/0144786 A1 | 6/2013 | Tong et al. | |
| 2013/0145441 A1 | 6/2013 | Mujumdar et al. | |
| 2014/0270401 A1 | 9/2014 | Irwin et al. | |
| 2014/0282237 A1 | 9/2014 | Fuzell-Casey | |
| 2016/0103982 A1* | 4/2016 | Boss | G06F 21/31 |
| | | | 726/7 |
| 2017/0163471 A1* | 6/2017 | Zheng | H04L 29/08594 |

FOREIGN PATENT DOCUMENTS

| | | |
|---|---|---|
| JP | 2006-505051 | 2/2006 |
| JP | 2007-004796 | 1/2007 |
| JP | 2008-152639 | 3/2008 |
| JP | 2008-204484 | 9/2008 |
| JP | 2009-541858 | 11/2009 |
| WO | 2013185326 | 12/2013 |
| WO | 2014165431 A1 | 10/2014 |
| WO | 2014187118 | 11/2014 |

* cited by examiner

SYSTEM AND METHOD FOR USER IDENTITY VERIFICATION, AND CLIENT AND SERVER BY USE THEREOF

CROSS REFERENCE TO RELATED APPLICATION

This application claims the benefits to Chinese Patent Application No. 201510082444.9, filed on Feb. 15, 2015, which is incorporated herein by reference in its entirety.

TECHNICAL FIELD

The present invention relates generally to the technologies of network security, and more particularly to a system and method for user identity verification.

BACKGROUND

In the Internet world, oftentimes serviced by the services provided by service providers, clients need to interact with the servers by which the service providers utilize to provide such services. Typically, it is after the service provider servers verify the identities of the users of the client end that the users are permitted to access the service from the client end.

The prior art technology verifies a user's identity through prompting the user to answer the security questions or challenges configured upon the registration of the account. If the user answers the security challenges with the right answers pre-configured by the user, it is determined that the user's identity is successfully verified.

However, there are several problems existing with the prior art technology. For example, the right answers are pre-configured by the user for the security challenges either at the time of user registration or subsequently during the user's normal business operation under the account. The answers configured manually in this manner can easily be decrypted such that un-authorized parties can use the decrypted answers to pass the server verification of the user identity. Once an un-authorized party bypasses the user identity verification of a server, accesses to the respective services configured for the comprised account can be obtained, consequently causing economic harm to the genuine account holder.

Therefore, there exists a need of a method of user identity verification to enhance user account security.

SUMMARY

According to an exemplary embodiment of the present disclosure, a method of user identity verification by a server, where the server pre-configures, by use of collected user information, verification information corresponding to accounts of users in a user verification information data store, the verification information including a plurality of verification security challenges and a plurality of respective first verification answers, includes detecting a condition to whether initiate a user identity verification is satisfied, where an account ID of a user is obtained from the condition. The method also includes inquiring the pre-configured user verification information about verification information matching the account ID and transmitting security challenges of the inquired verification information to the client. The method further includes receiving from the client second verification answers corresponding to the security challenges and comparing the second verification answers with the first verification answers to determine whether the user's identity is verified.

According to another exemplary embodiment of the present disclosure, a method of user identity verification by a client includes transmitting a triggering request to a server upon receiving a triggering command, the triggering request comprising an account ID of a user. The method also includes receiving from the server security challenges of verification information corresponding to the account ID, the verification information comprising security challenges and corresponding first verification answers generated by the server based on collected user information. The method further includes obtaining second verification answers corresponding to the received security challenges and transmitting the second verification answers to the server, where the server compares the second verification answers with the corresponding first verification answers to determine whether the user's identity is verified.

According to yet another exemplary embodiment of the present disclosure, a method of user identity verification by a client includes receiving from a server security challenges of verification information, the verification information comprising security challenges and corresponding first verification answers generated by the server based on collected user information. The method also includes obtaining second verification answers corresponding to the received security challenges and transmitting the second verification answers to the server, where the server compares the second verification answers with the corresponding first verification answers to determine whether a user's identity is verified.

According to still yet another exemplary embodiment of the present disclosure, a system for user identity verification includes a server and a client. The server is configured to pre-configure, by use of collected user information, verification information corresponding to accounts of users in a user verification information data store, the verification information including a plurality of verification security challenges and a plurality of respective first verification answers, receive from the client a triggering request, the triggering request including an account ID of a user, inquire the pre-configured user verification information about verification information matching the account ID, transmit security challenges of the inquired verification information to the client, receive from the client second verification answers corresponding to the security challenges, and compare the second verification answers with the first verification answers to determine whether the user's identity is verified. The client is configured to transmit to the server the triggering request, receive from the server the security challenges, obtain the second verification answers corresponding to the security challenges, and transmit the second verification answers to the server.

According to an exemplary embodiment of the present disclosure, a system for user identity verification includes a server and a client. The server is configured to pre-configure, by use of collected user information, verification information corresponding to accounts of users in a user verification information data store, the verification information including a plurality of verification security challenges and a plurality of respective first verification answers, detect a user's operations under an account meeting a pre-configured triggering condition, inquire the pre-configured user verification information about verification information matching an account ID of the user, transmit security challenges of the inquired verification information to the client, receive from the client second verification answers corresponding to the security challenges, and compare the second verification answers with the first verification answers to determine whether the user's identity is verified. The client is configured to receive from the server the security challenges, obtain the second verification answers corresponding to the security challenges, and transmit the second verification answers to the server.

According to yet another exemplary embodiment of the present disclosure, a server for user identity verification includes a pre-configuration module configured to pre-configure, by use of collected user information, verification information corresponding to accounts of users in a user verification information data store, the verification information including a plurality of verification security challenges and a plurality of respective first verification answers. The server also includes an inquiring and transmitting module configured to inquire the pre-configured user verification information about verification information matching an account ID of a user and to transmit security challenges of the inquired verification information to a client, where the inquiring and transmitting module is executed upon an initiating condition being met. The server further includes a receiving module configured to receive from the client second verification answers corresponding to the security challenges and a comparison module configured to compare the second verification answers with the first verification answers to determine whether the user's identity is verified.

According to still another exemplary embodiment of the present disclosure, a client for user identity verification includes a first transmitting module configured to, upon receiving a triggering command, transmit to a server a triggering request, the triggering request including an account ID of a user. The client also includes a receiving module configured to receive from the server security challenges of verification information corresponding to the account ID, the verification information comprising security challenges and corresponding first verification answers generated by the server based on collected user information. The client further includes an obtaining module configured to obtain second verification answers corresponding to the security challenges and a second transmitting module configured to transmit to the server the second verification answers, where the server compares the second verification answers with the corresponding first verification answers to determine whether a user's identity is verified.

According to still yet another exemplary embodiment of the present disclosure, a client for user identity verification includes a receiving module configured to receive from the server security challenges of verification information, the verification information comprising security challenges and corresponding first verification answers generated by the server based on collected user information. The client further includes an obtaining module configured to obtain second verification answers corresponding to the security challenges and a transmitting module configured to transmit to the server the second verification answers, where the server compares the second verification answers with the corresponding first verification answers to determine whether a user's identity is verified.

DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

In the following description, numerous specific details are set forth in order to provide a thorough understanding of the present disclosure. However, it will become obvious to those skilled in the art that the present disclosure may be practiced without these specific details. The descriptions and representations herein are the common means used by those experienced or skilled in the art to most effectively convey the substance of their work to others skilled in the art. In other instances, well-known methods, procedures, components, and circuitry have not been described in detail to avoid unnecessarily obscuring aspects of the present disclosure.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments mutually exclusive of other embodiments. Used herein, the terms "upper", "lower", "top", "bottom", "middle", "upwards", and "downwards" are intended to provide relative positions for the purposes of description, and are not intended to designate an absolute frame of reference. Further, the order of blocks in process flowcharts or diagrams representing one or more embodiments of the disclosure do not inherently indicate any particular order nor imply any limitations in the disclosure.

Embodiments of the present disclosure are discussed herein with reference to FIGS. 1A-10. However, those skilled in the art will readily appreciate that the detailed description given herein with respect to these figures is for explanatory purposes as the disclosure extends beyond these limited embodiments.

Figure 1A:
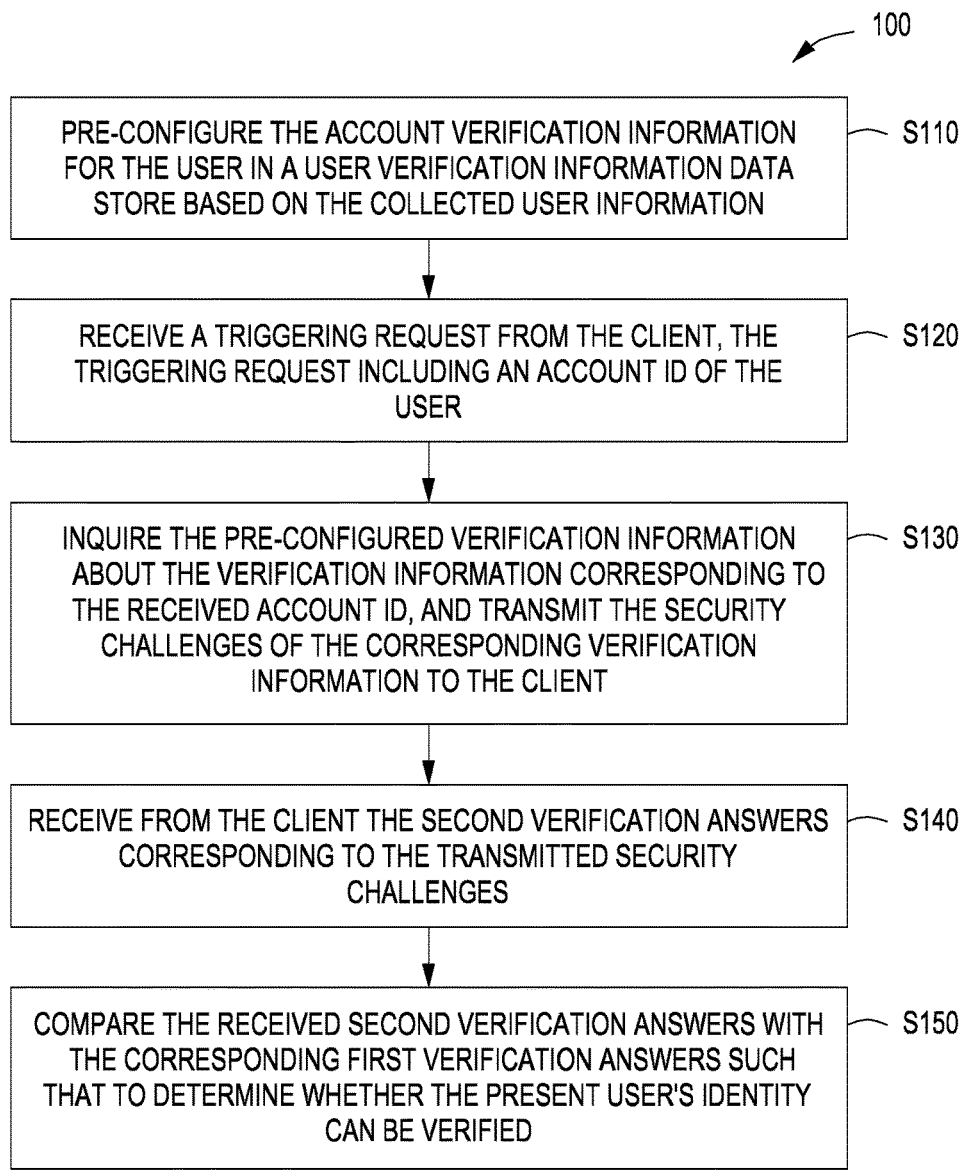
FIGS. 1A-1B are flow charts of exemplary methods of user identity verification illustrated from the perspective of a server in accordance with an embodiment of the present disclosure.
Figure 1B:
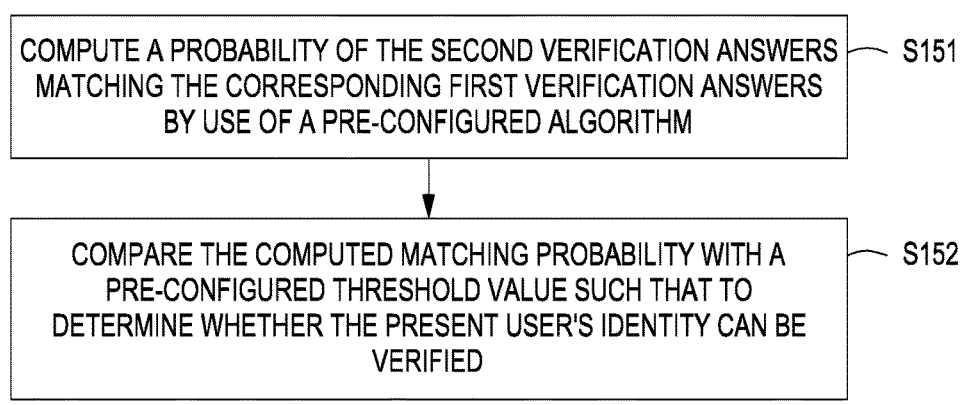

Referring to FIG. 1A, a flow chart of an exemplary method of user identity verification is shown in accordance with embodiments of the present disclosure. The method 100 starts in step S110, where a server pre-configures verification information of an account of a user in a user verification information data store based on the collected user information. The verification information includes verification security challenges and corresponding first verification answers. The server collects information from the user during the routine operations thereof. By use of the collected user information, the server can pre-configure account verification information for the user in the user verification information data store. The verification information includes a plurality of verification security challenges and a plurality of corresponding first verification answers.

In some embodiments, the collected user information is the account information of the user such as, for example, the information of the user's Alipay account. Correspondingly, the pre-configured verification information can have the verification information including the security challenges such as "how much is the balance of the present Alipay account" and "how much is the profit of the present month under the Yu'E Bao account", etc. Correspondingly, the first verification answer, i.e., the right answers, can be "$20,000" and "$74.1", respectively. Further, one of ordinary skills in the art will readily appreciate from this example that, at different points of time, there are different first verification answers, i.e., the right answers corresponding to the same security challenges. In other words, the first verification answers are dynamic and vary from time to time.

In some other embodiments, the collected user information is the operation information with regard to how the user operates the account. For example, the last operation the user performed under his or her Taobao account. In this case, the security challenges of the pre-configured verification information can be "what is the user's last login time for the Taobao account" and "what is the user's last login address for the Taobao account", etc. Correspondingly, the first verification answers can be "Jan. 26, 2015" and "Suzhou", respectively.

In some other embodiments, the collected user information is the information with regard to the user's mobile terminal. For example, the information of the user's cell phone device. In this case, the verification security challenges of the pre-configured verification information can be the information regarding the mobile terminal device of the user such as, for example, "what is the brand and model of the last cell phone the user owned". Correspondingly, the first verification answer can be "Xiaome 2S".

In some embodiments, in order to enhance the reliability of the method of user identity verification provided by the present disclosure, different verification information can be pre-configured in the user verification information data store for business scenarios at different risk level. Such verification information can be different in terms of the content of the verification security challenges, the number of verification security challenges, or both. For example, risk levels for business scenarios can be classified into three categories: a high risk (e.g., the second time verification of a payment passcode, a medium risk (e.g., the second time verification of user login), and low risk (e.g., unlinking a bank debit card). Accordingly, for the high risk category, the verification information can include 6 verification security challenges, the medium risk 5, and the low risk 3.

In step S120, the server receives a triggering request from a user, the triggering request including an account ID of the user. In real world business scenarios, if the user wants to perform corresponding business operations under an account registered at a web site, the user can send a triggering request from the client to the server. For example, when the user wants to modify the login passcode for an on-line bank account or to perform a transaction of transfer to another account from an on-line bank account, the user can send a request of changing passcode or a request of bank transfer from a client to a server of the corresponding on-line bank, respectively. For another example, if the user wants to tether a different mobile device to an on-line bank account, the user can send a tethering-switch request form the client to the server of the on-line bank. For yet another example, shopping at the web site of "Taobao" or using the web site of "Fanli" to shop at the web site of "Taobao", the user can utilize an Alipay account to transact payments for the merchandise purchased online, sending a payment request from a client to an Alipay server.

A client from which a user sends a triggering request includes, but not limited to, any fixed terminal, smart terminal, and mobile terminal. For example, such a client can be a laptop computer, desktop computer, set-top box, PDA (personal digital assistant), cellular device, iPhone, smartphone, iPad, iWatch, etc.

The triggering request received by the server can include an account ID of the user.

In step S130, the server inquires the pre-configured verification information about the verification information corresponding to the account ID included in the received triggering request, and transmits the verification security challenges of the corresponding verification information to the client.

Upon receiving a triggering request, the server can utilize the account ID of the user included in the triggering request to inquire the pre-configured verification information about the verification information corresponding to the triggering request. After obtaining the corresponding verification information, the server transmits the verification security challenges to the client.

In some embodiments, in step S110, various verification information can be pre-configured accordingly for various real world business risk scenarios. Upon receiving a trigger request from a client, the server determines the risk level corresponding to the received triggering request. Subsequently, the determined risk level is utilized by the server to inquire about the verification information that corresponds to the determined risk scenario level, the verification information including the verification security challenges as well as respective first verification answers. For example, when receiving a triggering request to unlink a bank debit card from an Alipay account, the server determines that the present risk scenario is in the category of low risk. Correspondingly, the inquired security challenges can be, for example, "what is the cellular number pre-stored at the bank of the debt card linked to the present Alipay account?", or "what is the passcode for the Alipay account tethered to the present bank debit card?", etc. Accordingly, the first verification answers can be, for example, "139xxxxxxxx", and "xxxxxx", etc.

In step S140, the server receives from the client the second verification answers, i.e., user's responses, corresponding to the verification security challenges.

Upon receiving the verification security challenges from the server, the client obtains the second verification answers corresponding to the received security challenges, and transmits the obtained second verification security answers to the server. The second verification security answers obtained by the client includes, but not limited to, the second verification answers entered by the user in real time response to the security challenges and then obtained by the client, or the second security answers pre-configured by the user and obtained by the client.

For example, the client can obtain the second verification answers entered by the user in real time response to the security challenges by, after receiving the verification security challenges from the server, displaying the received security challenges to the user, upon which the user views the displayed security challenges and subsequently enters the second verification answers.

For another example, the client can obtained the second verification answers pre-configured by the user by, pre-establishing a verification security answer store, which includes various second verification answers configured by the user. After receiving the verification security challenges from the server, the client terminal inquires the security answer store about the corresponding second verification answers.

In general, for n number of verification security challenges, there are n number of second verification answers; although there are cases where there are less than n number of second verification answers corresponding to the n number of challenges.

In step S150, the server compares the received second verification answers to the first verification answers, the result of which is utilized to determine whether the present user's identity can by successfully verified. After receiving the second verification answers from the client, the server compares the received second verification answers with the first verification answers of the verification information obtained before, and determines whether the present user's identity can be verified based on the result of the comparison.

When the second verification answers match the first verification answers, it is determined that the present user's identity is successfully verified. When the second verification answers don't match the first verification answers, it is determined that the present user's identity is not verified. The matching of the second verification answers with the first verification answers can be that the second verification answers are identical to the first verification answers; or the second verification answers include contents that are substantially identical to the first verification answers. For example, for a second verification answer "Jan. 26, 2016", it matches a first verification answer "2015-1-26" with substantially identical contents.

It should be pointed out that, in cases of a single verification security challenge, it can be determined that the present user's identity is verified when the corresponding second verification answer matches the first verification answer. But, in cases of multiple verification security challenges, various criteria can be implemented to determine whether the present user's identity can be verified. For example, a criterion can be that, when each of the second verification security answers matches the corresponding first verification answer, it is determined that the present user's identity is verified; or it can be based on whether the result of the comparison of the second verification answers with the first verification answers meets a pre-configured mapping standard. If the result of comparing the second verification answers with the first verification answers meets the pre-configured mapping standard, it is determined that the present user's identify is verified. Otherwise, it is determined that the present user's identity is not verified.

The above described mapping standard can be, for example, "2 matches out of 3 comparisons", "3 matches out of 5 comparisons", etc. In details, when there are 3 verification security challenges, a "2 matches of 3 comparisons" standard can be utilized to determine whether the present user's identity can be verified. If at least 2 out a total of 3 second verification answers match the corresponding first verification answers, it is determined that the present user's identity is successfully verified. When there are 5 verification security challenges, a "3 matches of 5 comparisons" standard can be utilized to determine whether the present user's identity can be verified. If at least 3 out a total of 5 second verification answers match the corresponding first verification answers, it is determined that the present user's identity is successfully verified. Further, different mapping standards can be configured for risk scenarios at different levels. For example, a "2 matches of 3 comparisons" standard can be configured for a low risk scenario where a bank debit card is to be unlinked.

In some other embodiments, the step S150 can also include steps S151-S152 (FIG. 1B) to enhance the reliability of positive verification of a user's identity. In step S151, a probability of a second verification answer matching a corresponding first verification answer is computed by use of a pre-configured algorithm. The pre-configured algorithm can be a prior art algorithm, an improved prior art algorithm, or an algorithm defined specifically under the circumstances. The matching probability can be a probability that the user is a genuine self when the second verification answers match the corresponding first verification answers; or the matching probability can be a probability that the user is a genuine self when the second verification answers don't match the corresponding first verification answers.

In cases where there is a single verification security challenge, the matching probability is a probability that the user is genuine with regard to the single verification security challenge. In cases where there are multiple verification security challenges, the matching probability is a probability that the user is genuine with regard to all the verification security challenges.

In step S152, the computed matching probability is compared to a pre-configured threshold value such that to determine whether the present user's identity can be verified. Different threshold values can be pre-configured at the server according to different risk levels of the business scenarios. For example, in a high risk scenario where a payment passcode is verified for the second time, a threshold value can be pre-configured at about 95%. For a medium risk scenario where the user attempts to login for the second time, a threshold value can be pre-configured at about 80%. For a low risk scenario where a bank debit card is unlinked, a threshold value can be pre-configured at about 50%.

Based on the result of the comparison of the computed matching probability with the pre-configured threshold value, it is determined whether the present user's identity can be verified. If the matching probability equals or exceeds the pre-configured threshold value, it is determined that the present user's identity is verified. If the matching probability does not exceed the pre-configured threshold value, it is determined that the present user's identity is not verified. Once the user's identity is not verified, either the user cannot perform any subsequent operations, or the user has to utilize other alternative identity verification methods to be verified again.

For example, a user A performs payment passcode verification for the second time. If the computed matching probability for the user A is 83.36%, which is apparently much lower than a pre-configured threshold value 95%, the user A is deemed not verified for the second time regarding payment passcode verification. If the user A instead performs login verification for the second time, and if the computed matching probability for the user A is the same 83.36%, which is higher than a pre-configured threshold value 80%, the user A is deemed verified for the second time regarding login verification.

By use of computing a probability of the second verification answers matching the corresponding first verification answers, and comparing the computed matching probability with a pre-configured threshold value, the present disclosure provides for enhanced reliability for positive verification of user identities.

In some other embodiments, the user verification information data store referred in the step S110 also includes input information that corresponds to the stored verification information. The input information includes computation parameters for computing a matching probability between a second verification answer and a first verification answer. Computation parameters can include a first probability of a second verification answer provided by a user matching a corresponding first verification answer, and a second probability of such second verification answer not matching the corresponding first verification answer. Computation parameters can further include a third probability of a second verification answer not provided by the user matching the corresponding first verification answer, and a fourth probability of such second verification answer not matching the corresponding first verification answer. In other words, computation parameters include the probabilities of a genuine user answering the verification security challenges correctly and wrongly, and users answering the verification security challenges correctly and wrongly. Answers to the corresponding security challenges pertaining to the user is considered security answers provided by the genuine user self. Answers to the corresponding security challenges pertaining to someone who is not the user is considered security answers provided by another user.

One exemplary way to obtain the above described computational parameters is through user testing. An exemplary user test can be that, first, every participating tester answers his or her own verification security challenges and others' verification security challenges. Next, statistics are computed for the number of times each participating tester answers correctly his or her own security challenges, the number of times each participating tester answers wrongly his or her own security challenges, the number of times each participating tester answers correctly others' security challenges, and the number of times each participating tester answers wrongly others' security challenges. Last, corresponding probabilities are computed as computation parameters. For example, for a security challenge "what is the model of the last mobile device owned", computation parameters obtained through user testing can be computed as the following:

TABLE 1

| | Answer Correctly | Answer Wrongly |
|---|---|---|
| Self | 92% | 8% |
| Non-self | 10% | 90% |

For different security challenges, corresponding computation parameters can be different.

Figure 2:
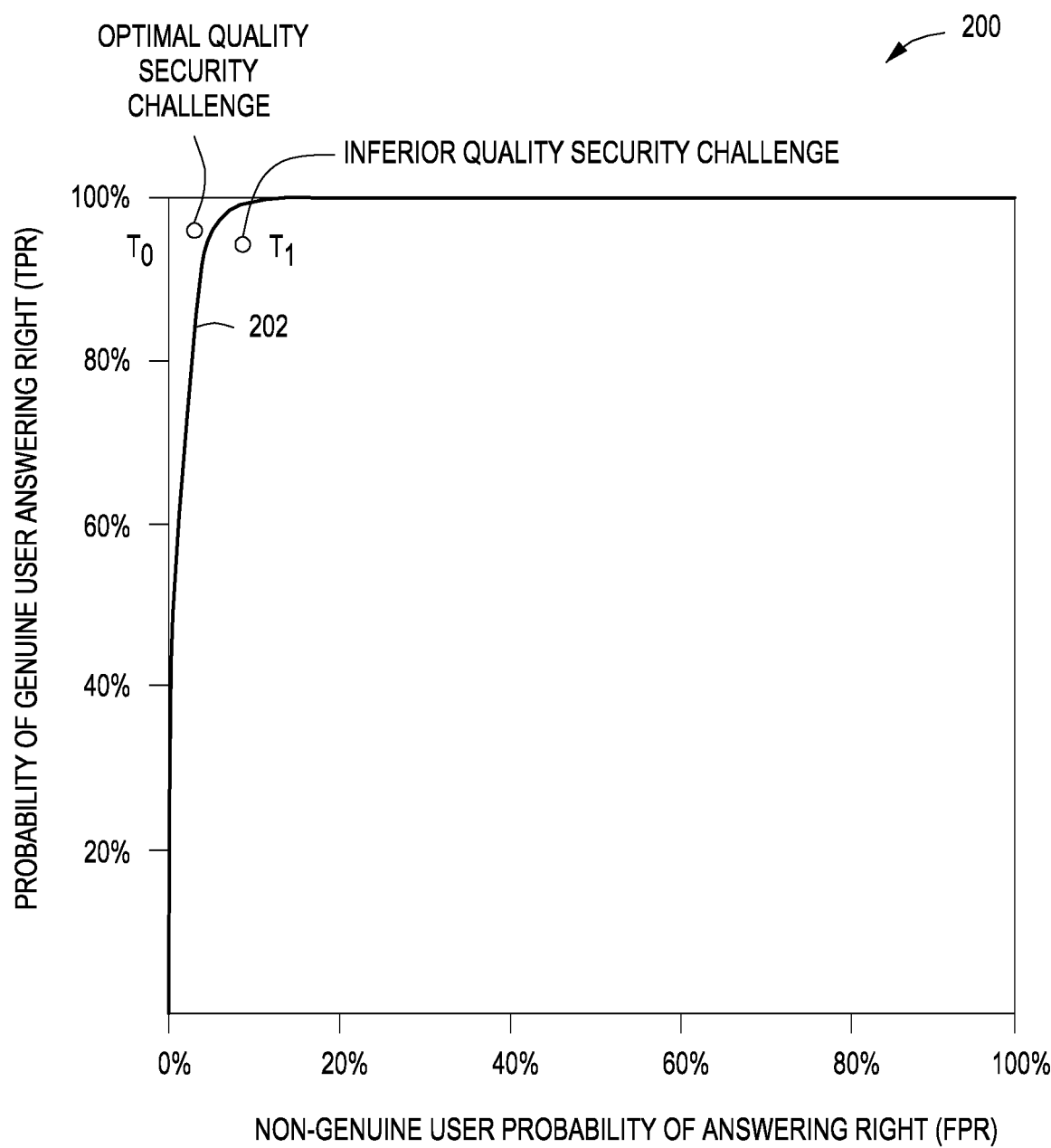
FIG. 2 is an illustration of a ROC curve of determining whether a security challenge is an optimal solution security challenge.

Further, in some embodiments, the above described security challenge can be an optimal solution security challenge. One of the standards to measure the performance quality of a security challenge is that the probability a user self answering it correctly is high, and at the same time the probability of other users answering it correctly is low. To quantify this standard, after obtaining the computation parameters for a security challenge by user testing, a graph of ROC curve is generated in a coordination having a x axis of FPR (False Positive Rate), i.e., the probability of other users (non-self) answering the security challenge correctly and a y axis of TPR (True Positive Rate), i.e., the probability of a user self answering the security challenge correctly. Referring to FIG. 2, an exemplary graph 200 of a ROC curve 202 is shown in accordance with embodiments of the present disclosure. The ROC curve 202 is generated based on the probability data of "self answering correctly" and "non-self answering correctly" collected from the security challenges defined by the businesses and having the best recognition probability. Point $T_0$ falls to the upper left side of the ROC curve 202, the security challenge represented by $T_0$ is considered an optimal security challenge. Point $T_1$ falls to the upper right side of the ROC curve 202, the security challenge represented by $T_1$ is considered an inferior security challenge. By use of selecting optimal security challenges that maximize the probability of a user self answering correctly and minimize the probability of other users answering correctly, the risks of imposter users being verified as authorized users can be lowered for business services.

Correspondingly, in the step S151, a matching probability of a second verification answer matching the corresponding first verification answer can be computed by use of an algorithm in the following. For a set of n security challenges, an ith probability of the second verification answer corresponding to the ith security challenge matching the corresponding first verification answer is computed. The ith probability is designated as the i+1th pretest probability, which is utilized to compute the i+1th probability of the corresponding first verification answers of the i+1th security challenge matching the corresponding first verification answer. Here, i is an integer within the range of 1–n. The ith matching probability includes an $i^+$th probability of the second verification answer corresponding to the ith security challenge matching the corresponding first verification answer, or an $i^-$th probability of the second verification answer corresponding to the ith security challenge not matching the corresponding first verification answer.

In particular, the first matching probability of a second verification answer to the first security challenge matching the corresponding first verification answer is computed by use of a pre-configured pretest probability. Next, the computed first matching probability is designated as the second pretest probability, which is utilized to compute the second matching probability of a second verification answer to the second security challenge matching the corresponding first verification answer. Following how the second matching probability is computed, the remaining n−2 matching probabilities are computed respectively for a second verification answer to the corresponding security challenge matching the corresponding first verification answer, the corresponding security challenge is one of the remaining n−2 security challenges in the set of n security challenges. When the nth matching probability of a second verification answer to the corresponding nth security challenge matching the corresponding first verification answer is computed, the last matching probability is computed and the computing of matching probability is done.

Correspondingly, in step S152, the computed nth matching probability is compared to a pre-configured threshold value such that to determine whether the user's identity can be verified. In some embodiments, for the ith security challenge, when the second verification answer is correct, the probability of the user being genuine (the ith probability) can be computed by formula (1):

$$P_i(\text{self}|\text{right}) = \frac{P_i(\text{right}|\text{self}) * P_i(\text{self})}{P_i(\text{right}|\text{non-self}) * P_i(\text{non-self}) + P_i(\text{right}|\text{self}) * P_i(\text{self})} \quad (1)$$

For the same ith security challenge, when the second verification answer is wrong, the probability of the user still being genuine (the i⁻th probability) can be computed by formula (2):

$$P_i(\text{self}|\text{wrong}) = \frac{P_i(\text{wrong}|\text{self}) * P_i(\text{self})}{P_i(\text{wrong}|\text{non-self}) * P_i(\text{non-self}) + P_i(\text{wrong}|\text{self}) * P_i(\text{self})} \quad (2)$$

In the above two formulas, $P_i(\text{self}|\text{right})$ is the i⁺th matching probability of a second verification answer to the ith security challenge matching the corresponding first verification answer; $P_i(\text{right}|\text{self})$ is the first probability corresponding to the ith security challenge; $P_i(\text{right}|\text{non-self})$ is the third probability corresponding to the ith security challenge; $P_i(\text{self}|\text{wrong})$ is the i⁻th non-matching probability of a second verification answer to the ith security challenge not matching the corresponding first verification answer; $P_i(\text{wrong}|\text{self})$ is the second probability corresponding to the ith security challenge; $P_i(\text{wrong}|\text{non-self})$ is the fourth probability corresponding to the ith security challenge; and $P_i(\text{self})$ is the ith pretest probability, the value of which is the i−1th matching probability, and $P_i(\text{non-self})=1-P_i(\text{self})$.

For the first security challenge, $P_1$ (self) and $P_1$ (non-self) can be each configured as 50%. Also, answering correctly refers to a second verification answer matching the corresponding first verification answer; answering wrongly refers to a second verification answer not matching the corresponding first verification answer. In cases there are multiple security challenges, the computed matching probability of the present security challenge is designated as the pretest probability for the next security challenge. For a set of n security challenges, the nth computed matching probability is the final matching probability of the second verification answers matching the corresponding first verification answers.

For example, a user A answers three security challenges, the correctness of the answers are shown in Table 2, in which "correct" refers to that the second verification answer matches the corresponding first verification answer, and "wrong" refers to that the second verification answer does not match the corresponding first verification answer.

TABLE 2

| | Security challenge 1 | Security challenge 2 | Security challenge 3 |
|---|---|---|---|
| User A | correct | wrong | correct |

The three security challenges have the computational parameters configured as the same, which is shown in Table 3.

TABLE 3

| | Correct | wrong |
|---|---|---|
| Self | 95% | 5% |
| Non-self | 10% | 90% |

When the first security challenge 1 is answered correctly, the probability that the user A is the user himself or herself can be computed by the formula (3):

$$P_1(\text{self}|\text{right}) = \frac{P_2(\text{right}|\text{self}) * P_2(\text{self})}{P_2(\text{right}|\text{non-self}) * P_2(\text{non-self}) + P_2(\text{right}|\text{self}) * P_2(\text{self})} \quad (3)$$

$$= \frac{95\% * 50\%}{10\% * 50\% + 95\% * 50\%}$$

$$= 90.47\%$$

Next, the computed $P_1(\text{self}|\text{right})$ is designated as $P_2$ (self) in the following formula (4), which is utilized to compute the probability that the user A is himself or herself when the security challenge 2 is answered wrongly:

$$P_2(\text{self}|\text{wrong}) = \frac{P_2(\text{wrong}|\text{self}) * P_2(\text{self})}{P_2(\text{wrong}|\text{non-self}) * P_2(\text{non-self}) + P_2(\text{wrong}|\text{self}) * P_2(\text{self})} \quad (4)$$

$$= \frac{5\% * 90.47\%}{90\% * 9.53\% + 5\% * 90.47\%}$$

$$= 34.53\%$$

Next, $P_2(\text{self}|\text{wrong})$ is designated as $P_3$ (self) in the following formula (5), which is utilized to compute the probability that the user A is himself or herself when the security challenge 3 is answered correctly:

$$P_3(\text{self}|\text{right}) = \frac{P_3(\text{right}|\text{self}) * P_3(\text{self})}{P_3(\text{right}|\text{non-self}) * P_3(\text{non-self}) + P_3(\text{right}|\text{self}) * P_3(\text{self})} \quad (5)$$

$$= \frac{95\% * 34.53\%}{10\% * 65.47\% + 95\% * 34.53\%}$$

$$= 83.36\%$$

Last, the probability of the user A being genuine is 83.36%, i.e., for those three security challenges, the matching probability of the second verification answers matching the corresponding first verification answers is 83.36%.

In some other embodiments, computational parameters can also include a pre-configured probability for each security challenge. The pre-configured probabilities can be the same or different. Correspondingly, in step S151, a matching probability of second verification answers matching the corresponding first verification answers can be computed by use of an algorithm in the following. For a set of n security challenges, by use of a pre-configured probability, an initial ith probability of a second verification answer corresponding to the ith security challenge matching the corresponding first verification answer is computed for each of the security challenge. Next, by use of pre-configured algorithms, a final probability of the second verification answers matching the corresponding first verification answers is computed with all the initial probabilities corresponding to all the security challenges. An initial probability can be a probability that a user is genuine, including a first initial probability of the second verification answer matching the corresponding first verification answer and a second initial probability of the second verification answer not matching the corresponding first verification answer.

In the step S152, the computed final matching probability is compared to a pre-configured threshold value such that to determine whether the user's identity can be verified. In some embodiments, the initial probability for each security challenge can be computed by formula (6) or formula (7):

$$P(\text{self} \mid \text{right}) = \frac{P(\text{right} \mid \text{self}) * P(\text{self})}{P(\text{right} \mid \text{non-self}) * P(\text{non-self}) + P(\text{right} \mid \text{self}) * P(\text{self})} \quad (6)$$

$$P(\text{self} \mid \text{wrong}) = \frac{P(\text{wrong} \mid \text{self}) * P(\text{self})}{P(\text{wrong} \mid \text{non-self}) * P(\text{non-self}) + P(\text{wrong} \mid \text{self}) * P(\text{self})} \quad (7)$$

P(self|right) is the first initial probability of a second verification answer corresponding to each security challenge matching the corresponding first verification answer;
P(right|self) is the first probability corresponding to each security challenge;
P(right|non-self) is the third probability corresponding to each security challenge;
P(self|wrong) is the second initial probability of a second verification answer corresponding to each security challenge not matching the corresponding first verification answer;
P(wrong|self) is the second probability corresponding to each security challenge;
P(wrong|non-self) is the fourth probability corresponding to each security challenge; and
P(self) is the pre-configured probability corresponding to each security challenge,
P(non-self)=1−P(self). The first, second, third, and fourth probabilities of each security challenge can be the same or different.

As to the pre-configured algorithms which are utilized to compute the final probability, an exemplary algorithm can be an average of all the computed initial probabilities corresponding to all the security challenges, or an expected value of all the initial probabilities corresponding to all the security challenges. Such algorithms are not limited to the above described, any algorithm that computes a reasonable final probability over the initial probabilities is within the scope of the present disclosure.

Further, the two above described pre-configured algorithms to compute the matching probability of the second verification answers matching the corresponding first verification answers are also exemplary without limiting the scope of the present disclosure.

Figure 3:
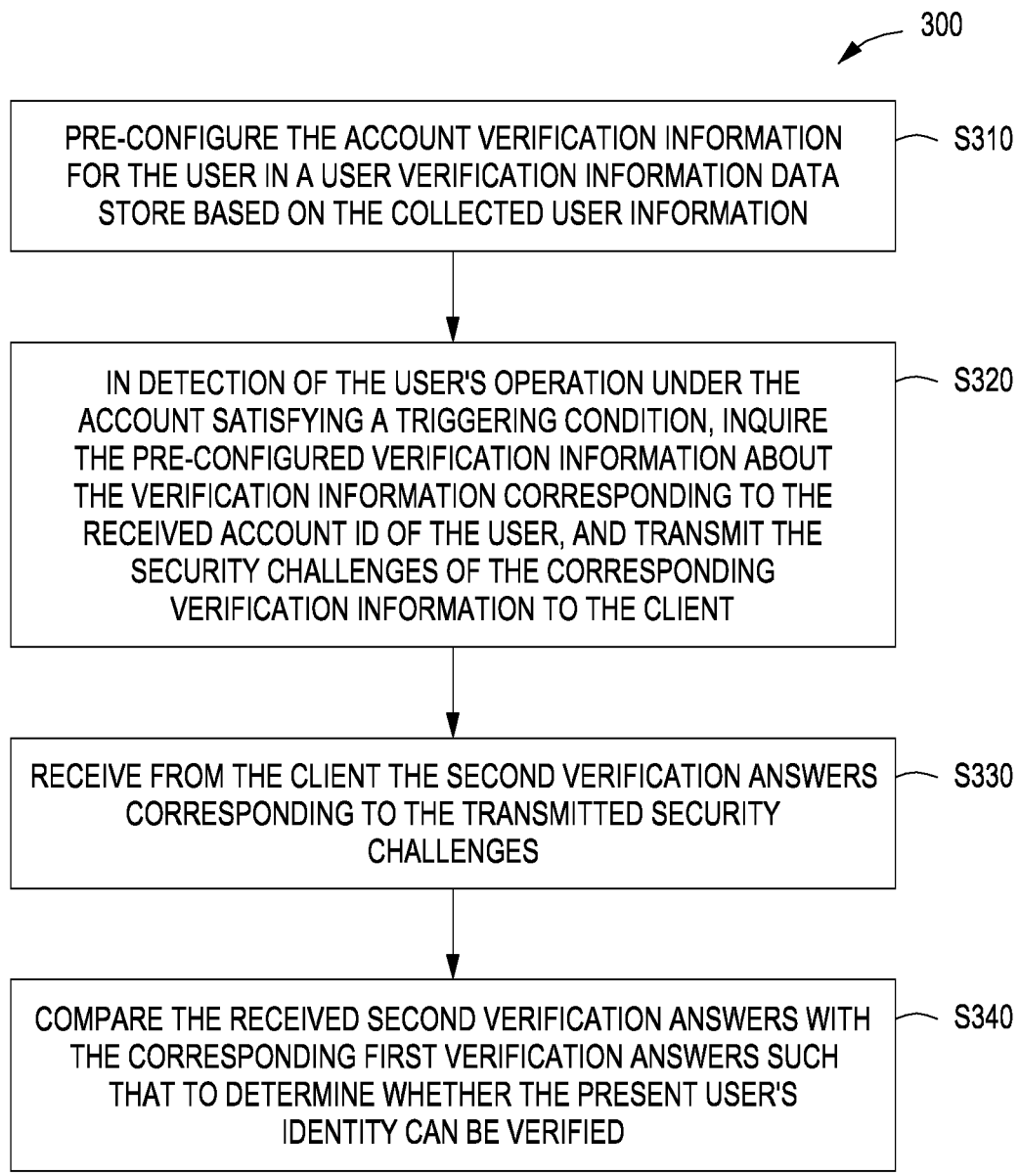
FIG. 3 is a flow chart of another exemplary method of user identity verification illustrated from the perspective of a server in accordance with an embodiment of the present disclosure.

Referring to FIG. 3, a flow chart of another method of user identity verification is shown in accordance with embodiments of the present disclosure. Method 300 starts in step S310, which is substantially similar to the step S110 of FIG. 1A and the details are not repeated here for the purpose of simplicity.

In step S320, the server detects that the user operates the account to meet a triggering condition, after which the server inquires about the verification information corresponding to the account ID of the user, and transmits the security challenges of the inquired verification information to the client of the user.

Triggering conditions can be that the server detects that the user performs certain business operations under the account. For example, the user logs into the Taobao account from the cell phone to modify the passcode for the Taobao account, or the user logs into the Alipay account from a Fanli account. Triggering conditions can also be that the server detects a terminal change at the user's end. For example, the server detects that the user is logging into the account utilizing a cell phone of a model different than the model utilized in the last login, or the server detects that the user logs into the account from a foreign address, or the server detects that the devices utilized by the user are abnormal in general or not recognized specifically for the user by the server.

The server can obtain the account ID by analyzing the account information of the user. The step of inquiring the pre-configured verification information about the verification information corresponding to the account ID of the user and the transmitting of the inquired verification information to the user at the client is substantially similar to the step S130, and the details are not repeated here for the purpose of simplicity.

In step S330, the server receives the second verification answers corresponding to the security challenges from the client. In step S340, the server compares the received second verification answers to the corresponding first verification answers such that to determine whether the user's identity can be verified. The details of the steps S330 and S340 are substantially similar to those of the steps S140 and S150, and therefore not repeated here for the purpose of simplicity.

The above described verification information is pre-configured based on the user information collected by the server. Therefore, such verification information cannot be easily comprehended by imposter users and contributes to enhanced user account security. Further, by use of configuring different security challenges based on business scenarios at different risk levels, computing the matching probabilities of multiple second verification answers matching the corresponding first verification answers, configuring different threshold values based on different business scenarios at different risk levels, and comparing the computed matching probability with the pre-configured threshold value to determine whether the user's identity can be verified, the reliability of positive verification of user identify can be enhanced.

Figure 4:
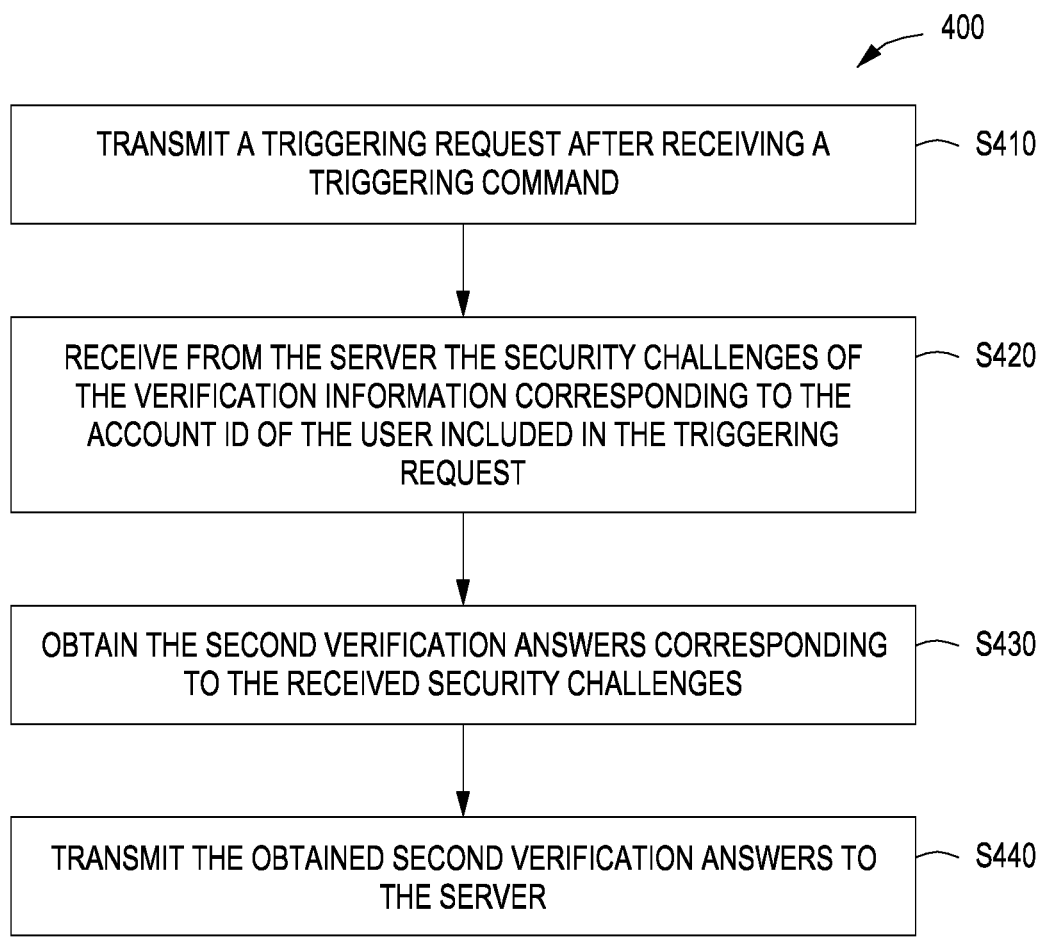
FIG. 4 is a flow chart of an exemplary method of user identity verification corresponding to the exemplary method of FIG. 1A and illustrated from the perspective of a client in accordance with an embodiment of the present disclosure.

Referring to FIG. 4, a flow chart of a method of verifying user identity corresponding to FIG. 1A and illustrated from a client's perspective is shown in accordance with embodiments of the present disclosure. Method 400 starts in step S410, where upon receiving a triggering command, the client transmits to a server the received triggering command, the triggering command including an account ID of the user.

A triggering command can be that the user logs into the account from a web site that does not host the account, for example, the user logs into the Alipay account from the Fanli web site. A triggering command can also be that the user performs business operations under the account, for example, the user transacts bank transfers under an online bank account. A triggering command can also be that the user logs into the account from a foreign address or a device that is abnormal in general or not recognized specifically for the user by the server. The account ID can be obtained from the account information of the user by the client upon receiving the triggering command.

In step S420, the client receives from the server the security challenges of the verification information corresponding to the account ID of the user, the verification information including the security challenges generated by the server based on the collected user information and corresponding first verification answers.

In step S430, the client obtains the second verification answers corresponding to the security challenges. After receiving from the server the security challenges, the client obtains the second verification answers to the security challenges. Similar to those described in the step S140, the second verification answers obtained at the client can be entered in real time by the user at the client in response to the security challenges, or it can be the user pre-configured verification answers that are retrieved by the client.

In step S440, the client transmits to the server the obtained second verification answers. The server receives the second verification answers and compares to the corresponding first verification answers such that to determine whether the present user's identity can be verified.

Figure 5:
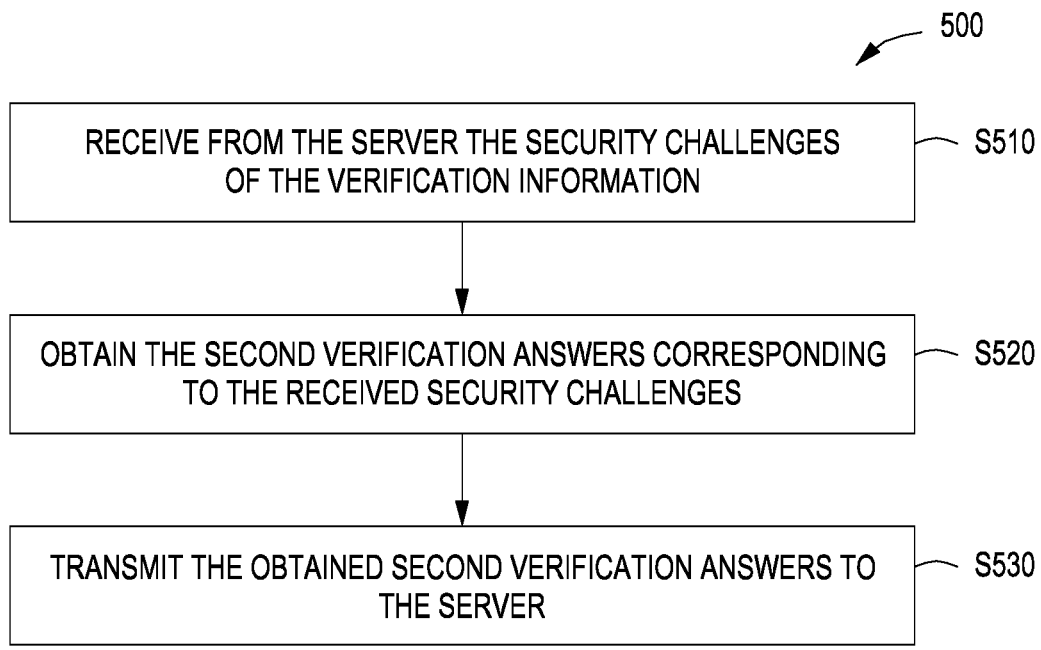
FIG. 5 is a flow chart of an exemplary method of user identity verification corresponding to the exemplary method of FIG. 3 and illustrated from the perspective of a client in accordance with an embodiment of the present disclosure.

Referring to FIG. 5, a flow chart of a method of verifying user identity corresponding to FIG. 3 and illustrated from a client's perspective is shown in accordance with embodiments of the present disclosure. Method 500 starts in step S510, where the client receives from the server the security challenges of the verification information, the verification information including the security challenges generated by the server based on the collected user information and the corresponding first verification answers.

In step S520, the client obtains the second verification information corresponding to the received security challenges. In step S530, the client transmits the obtained second verification answers to the server to request the server to compare the second verification answers with the corresponding first verification answers and to determine whether the present user's identity can be verified. Other details are substantially similar to those of the steps S420-S440 and not repeated here for the purpose of simplicity.

Figure 6:
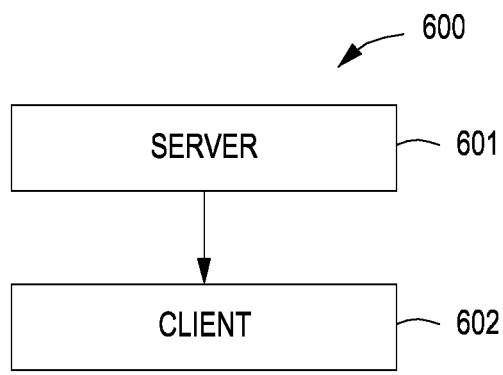
FIG. 6 is a block diagram of an exemplary system for user identity verification in accordance with an embodiment of the present disclosure.

Referring to FIG. 6, a block diagram of a system for verifying user identification is shown in accordance with embodiments of the present disclosure. The system 600 includes a server 601 and a client 602. In some embodiments, the server 601 is configured to collect users' information and pre-configure the verification information corresponding to a user's account in a user verification information data store. The verification information includes security challenges and corresponding first verification answers. The server 601 is also configured to receive triggering requests from the client, the triggering request including an account ID of the user and to inquire the pre-configured user verification information about the verification information corresponding to the account ID. The server 601 is further configured to transmit the security challenges of the inquired verification information to the client, to receive from the client the second verification answers corresponding to the security challenges, and to compare the received second verification answers with the corresponding first verification answers to determine whether the present user's identity can be verified.

The client 602 is configured to transmit a triggering request to the server 601, to receive from the server the security challenges, to obtain the second verification answers corresponding to the security challenges, and to transmit the obtained second verification answers to the server.

In some other embodiments, in addition to or in place of the server 601 receiving triggering requests from the client, the server 601 is configured to detect whether the user's operations under the account meet a pre-configured triggering condition. When the pre-configured triggering condition is met, the server 601 is configured to inquire the pre-configured user verification information about the verification information corresponding to the account ID of the user. Correspondingly, the client 602 is configured to receive from the server the security challenges, to obtain the second verification answers corresponding to the security challenges, and to transmit the obtained second verification answers to the server.

Figure 7:
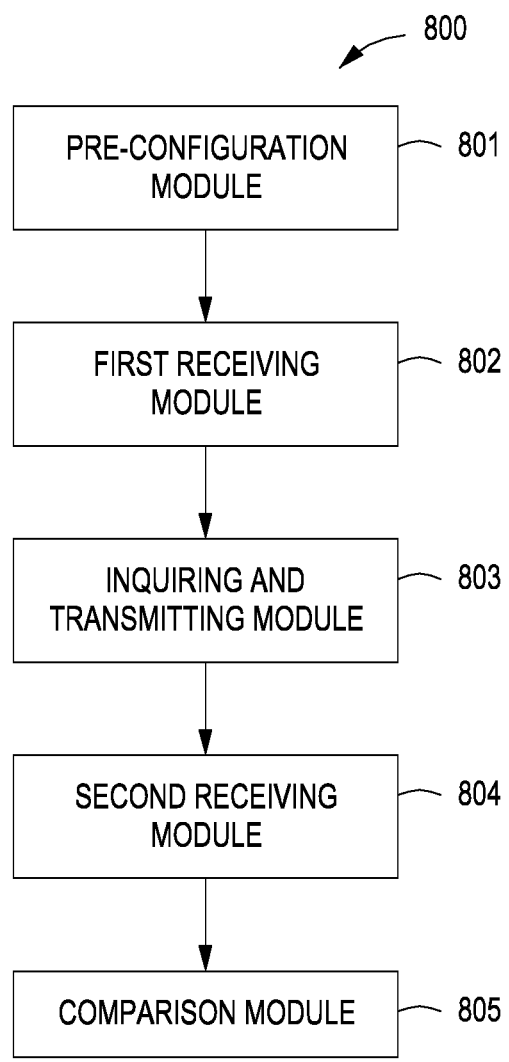
FIG. 7 is a block diagram of an exemplary server for user identity verification in accordance with an embodiment of the present disclosure.

Referring to FIG. 7, a block diagram of a server for verifying user identification is shown in accordance with embodiments of the present disclosure. Server 800 includes a pre-configuration module 801, a first receiving module 802, an inquiring and transmitting module 803, a second receiving module 804 and a comparison module 805. The pre-configuration module 801 is configured to collect users' information and pre-configure the verification information corresponding to a user's account in a user verification information data store. The verification information includes security challenges and corresponding first verification answers. The first receiving module 802 is configured to receive triggering requests from the client, the triggering request including an account ID. The inquiring and transmission module 803 is configured to inquire the pre-configured user verification information about the verification information corresponding to the account ID and to transmit the security challenges of the inquired verification information to the client. The second receiving module 804 is configured to receive from the client the second verification answers corresponding to the security challenges. The comparison module 805 is configured to compare the received second verification answers with the corresponding first verification answers to determine whether the present user's identity can be verified.

Figure 8:
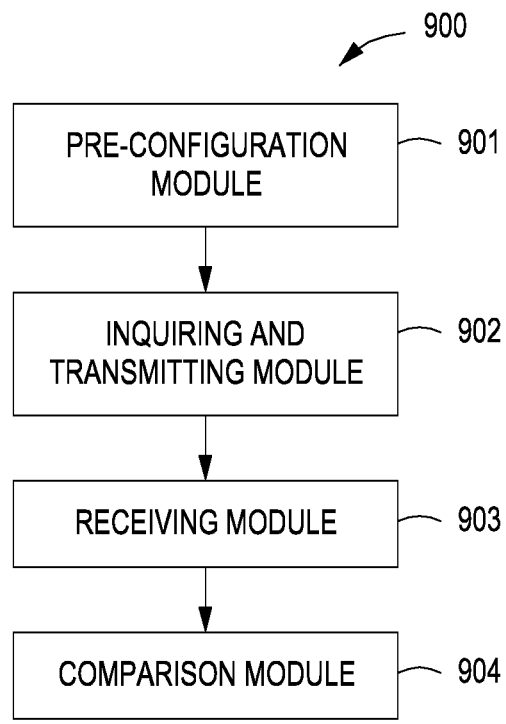
FIG. 8 is a system block diagram of another exemplary server for user identity verification in accordance with an embodiment of the present disclosure.

Referring to FIG. 8, a block diagram of another server for verifying user identification is shown in accordance with embodiments of the present disclosure. Server 900 includes a pre-configuration module 901, an inquiring and transmitting module 902, a receiving module 903 and a comparison module 904. The pre-configuration module 901 is configured to collect users' information and pre-configure the verification information corresponding to a user's account in a user verification information data store. The verification information includes security challenges and corresponding first verification answers. The inquiring and transmission module 902 is configured to, upon detecting the user's operations under the account meeting a pre-configured condition, inquire the pre-configured user verification information about the verification information corresponding to the account ID and transmit the security challenges of the inquired verification information to the client. The receiving module 903 is configured to receive from the client the second verification answers corresponding to the security challenges. The comparison module 904 is configured to compare the received second verification answers with the corresponding first verification answers to determine whether the present user's identity can be verified.

In some embodiments, the pre-configuration module 801 of FIG. 7 and the pre-configuration module 901 of FIG. 8 are further configured to pre-configure in the user verification information data store input information corresponding to the verification information, the input information including computation parameters for computing matching probabilities of second verification answers matching corresponding first verification answers.

Exemplary computation parameters include a first probability of a second verification answer provided by a user self matching the corresponding first verification answer, a second probability of such user self verification answer not matching the corresponding first verification answer, a third probability of a second verification answer provided by other users matching the corresponding first verification answer, and a fourth probability of such other user second verification answer not matching the corresponding first verification answer.

In some embodiments, the comparing module 805 of FIG. 7 and the comparing module 904 of FIG. 8 include a computing sub-module and a comparison sub-module (not shown). The computing sub-module is configured to computing the matching probability of the second verification answers matching the corresponding first verification answers by use of a pre-configured algorithm. The comparison sub-module is configured to compare the computed matching probability with a pre-configured threshold value to determine whether the present user's identity can be verified. Exemplary matching probabilities can be a probability that the user is genuine when second verification answers match the corresponding first verification answers, or a probability that the user is genuine when second verification answers do not match the corresponding first verification answers.

In some embodiments, the computing sub-module includes a first computing sub-module, a second computing sub-module and a third computing sub-module. The first computing sub-module is configured to compute a first probability of a second verification answer to the first security challenge matching the corresponding first verification answer by use of a pre-configured pretest probability. The second computing sub-module is configured to designate the computed first probability as the second pretest probability, and to compute a second probability of the a second verification answer to the second security challenge matching the corresponding first verification answer by use of the second pretest probability. The third computing sub-module is configured to repeat the process of computing the second probability to compute the remaining n–2 probabilities of a second verification answer matching the corresponding first verification answer, each second verification answer corresponding to each of the remaining n–2 security challenges, until the nth probability is computed for the nth security challenge. In the cases where there is a single security challenge, only the first computing sub-module is executed to compute the matching probability of a second verification answer to a security challenge matching the corresponding first verification answer. In the cases where there are two security challenges, both the first computing sub-module and the second computing sub-module are executed to compute the matching probability of second verification answers to security challenges matching the corresponding first verification answers.

Correspondingly, the comparison sub-module includes a first comparison sub-module configured to compare the nth probability with a pre-configured threshold value.

In some other embodiments, the computing sub-module includes an initial computing sub-module configured to compute an initial matching probability of a second verification answer to each security challenge matching the corresponding first verification answer by use a pre-configured probability. The computing sub-module also includes a final computing sub-module configured to compute a final matching probability with all the initial matching probabilities for all the security challenges by use of a pre-configured algorithm.

Correspondingly, the comparison sub-module includes a second comparison sub-module configured to compare the computed final matching probability with a pre-configured threshold value.

Figure 9:
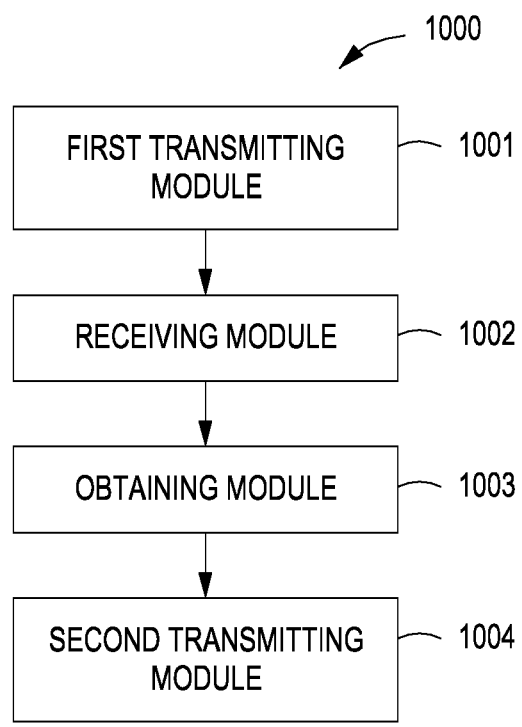
FIG. 9 is a system block diagram of an exemplary client for user identity verification in accordance with an embodiment of the present disclosure.

Referring to FIG. 9, a block diagram of a client for verifying user identification is shown in accordance with embodiments of the present disclosure. Client 1000, corresponding to the server 800, includes a first transmitting module 1001, a receiving module 1002, an obtaining module 1003 and a second transmitting module 1004. The first transmitting module 1001 is configured to transmit to the server a triggering request, the triggering request including an account ID of the user. The receiving module 1002 is configured to receive from the server security challenges of the verification information corresponding to the account ID, the verification information including the security challenges generated by the server based on the collected user information and the corresponding first verification answers. The obtaining module 1003 is configured to obtain second verification answers corresponding to the security challenges. The second transmitting module 1004 is configured to transmit to the server the obtained second verification answers and to request the server to compare the second verification answers to the corresponding first verification answers such that to determine whether the present user's identity can be verified.

Figure 10:
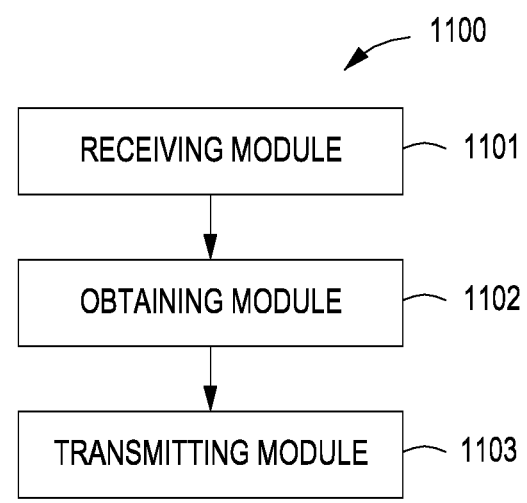
FIG. 10 is a system block diagram of another exemplary client for user identity verification in accordance with an embodiment of the present disclosure.

Referring to FIG. 10, a block diagram of another client for verifying user identification is shown in accordance with embodiments of the present disclosure. Client 1100, corresponding to the server 900, includes a receiving module 1101, an obtaining module 1102 and a transmitting module 1103. The receiving module 1101 is configured to receive from the server security challenges of the verification information corresponding to the account ID, the verification information including the security challenges generated by the server based on the collected user information and the corresponding first verification answers. The obtaining module 1102 is configured to obtain second verification answers corresponding to the security challenges. The transmitting module 1103 is configured to transmit to the server the obtained second verification answers and to request the server to compare the second verification answers to the corresponding first verification answers such that to determine whether the present user's identity can be verified.

Embodiments of the present disclosure can be implemented using software, hardware, firmware, and/or the combinations thereof. Regardless of being implemented using software, hardware, firmware or the combinations thereof, instruction code can be stored in any kind of computer readable media (for example, permanent or modifiable, volatile or non-volatile, solid or non-solid, fixed or changeable medium, etc.). Similarly, such medium can be implemented using, for example, programmable array logic (PAL), random access memory (RAM), programmable read only memory (PROM), read only memory (ROM), electrically erasable programmable ROM (EEPROM), magnetic storage, optical storage, digital versatile disc (DVD), or the like.

It is necessary to point out that, modules or blocks described by embodiments of the present disclosures are logical modules or logical blocks. Physically, a logical module or logical block can be a physical module or a physical block, a part of a physical module or a physical block, or the combinations of more than one physical modules or physical blocks. Physical implementation of those logical module or logical blocks is not of essence. The realized functionalities realized by the modules, blocks and the combinations thereof are key to solving the problems addressed by the present disclosure. Further, in order to disclose the novelties of the present disclosure, the above described embodiments do not disclose about those modules or blocks not too related to solving the problems addressed by the present disclosure, which does not mean that the above described embodiments cannot include other modules or blocks.

It is also necessary to point out that, in the claims and specification of the present disclosure, terms such as first and second only are for distinguishing an embodiment or an operation from another embodiment or operation. It does not require or imply that those embodiments or operations having any such real relationship or order. Further, as used herein, the terms "comprising," "including," or any other variation intended to cover a non-exclusive inclusion, such that a process, method, article, or apparatus that comprises a list of elements does not include only those elements but may include other elements not expressly listed or inherent to such process, method, article, or apparatus. Absent further limitation, elements recited by the phrase "comprising a" does not exclude a process, method, article, or apparatus that comprises such elements from including other same elements.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable medium used to actually carry out the distribution. The embodiments disclosed herein may also be implemented using software modules that perform certain tasks. These software modules may include script, batch, or other executable files that may be stored on a computer-readable storage media or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

Although the present disclosure and its advantages have been described in detail, it should be understood that various changes substitutions, and alterations can be made herein without departing from the spirit and scope of the disclosure as defined by the appended claims. Many modifications and variations are possible in view of the above teachings. The embodiments were chosen and described in order to best explain the principles of the disclosure and its practical applications, to thereby enable others skilled in the art to best utilize the disclosure and various embodiments with various modifications as may be suited to the particular use contemplated.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

Embodiments according to the present disclosure are thus described. While the present disclosure has been described in particular embodiments, it should be appreciated that the disclosure should not be construed as limited by such embodiments, but rather construed according to the below claims.

What is claimed is:

1. A method of verifying on-line identities, the method comprising:
receiving, with a server, a request to perform an action;
determining a series of questions with the server, the series of questions being based on a content of the request;
receiving a series of user answers to the series of questions with the server;
determining, with the server, whether the series of user answers match a corresponding series of verification answers;
determining a running verification probability value for the series of questions and user answers with the server, the determining including:
for each other-than-first question in the series with a matching answer, determining the running verification probability value based on a probability that a first person would answer a question about themselves correctly, a probability that a second person would answer the question about the first person correctly, a previous probability value from a previous question and answer in the series, and a determined probability value based on the previous probability value;

for each other-than-first question in the series with a non-matching answer, determining the running verification probability value based on a probability that the first person would answer the question about themselves incorrectly, a probability that the second person would answer the question about the first person incorrectly, the previous probability, and the determined probability value;

determining, with the server, whether the running verification probability value from a last question and answer in the series exceeds a threshold value;

verifying, with the server, an on-line identity when the running verification probability value from the last question exceeds the threshold value;

allowing, with the server, subsequent on-line operations when the on-line identity has been verified; and preventing, with the server, subsequent on-line operations until the on-line identity can be verified.

2. The method of claim 1, further comprising determining a risk level of the request based on the content of the request.

3. The method of claim 2, further comprising setting the threshold value based on the risk level.

4. The method of claim 3, wherein the series of questions are based on the risk level.

5. The method of claim 3, wherein for the first question in the series of questions, the previous probability value and the determined probability value are a positive value less than one.

6. The method of claim 5, wherein for each question in the series that follows the first question, the determined probability value is one minus the previous probability value.

7. The method of claim 6, wherein the running verification probability value determined for matching answers is a first numerical value divided by a second numerical value, the first numerical value being the probability that the first person would answer the question about themselves correctly multiplied times the previous probability value, the second numerical value being a product summed with the first numerical value, the product being the probability that the second person would answer the question about the first person correctly multiplied times the determined probability.

8. The method of claim 7, wherein the running verification probability value determined for non-matching answers is a third numerical value divided by a fourth numerical value, the third numerical value being the probability that the first person would answer the question about themselves incorrectly multiplied times the previous probability value, the fourth numerical value being a product summed with the third numerical value, the product being the probability that the second person would answer the question about the first person incorrectly multiplied times the determined probability value.

9. A non-transitory computer readable storage medium having embedded therein program instructions, which when executed by one or more processors of a device, causes the device to execute a process for verifying on-line identities, the process comprising:

receiving, with a server, a request to perform an action;

determining a series of questions with the server, the series of questions being based on a content of the request;

receiving a series of user answers to the series of questions with the server;

determining, with the server, whether the series of user answers match a corresponding series of verification answers;

determining a running verification probability value for the series of questions and user answers with the server, the determining including:

for each other-than-first question in the series with a matching answer, determining the running verification probability value based on a probability that a first person would answer a question about themselves correctly, a probability that a second person would answer the question about the first person correctly, a previous probability value from a previous question and answer in the series, and a determined probability value based on the previous probability value;

for each other-than-first question in the series with a non-matching answer, determining the running verification probability value based on a probability that the first person would answer the question about themselves incorrectly, a probability that the second person would answer the question about the first person incorrectly, the previous probability, and the determined probability value;

determining, with the server, whether the running verification probability value from a last question and answer in the series exceeds a threshold value;

verifying, with the server, an on-line identity when the running verification probability value from the last question exceeds the threshold value;

allowing, with the server, subsequent on-line operations when the on-line identity has been verified; and preventing, with the server, subsequent on-line operations until the on-line identity can be verified.

10. The medium of claim 9, wherein the method further comprises determining a risk level of the request based on the content of the request.

11. The medium of claim 10, wherein the method further comprises setting the threshold value based on the risk level.

12. The medium of claim 11, wherein the series of questions are based on the risk level.

13. The medium of claim 12, wherein for the first question in the series of questions, the previous probability value and the determined probability value are a positive value less than one.

14. The medium of claim 13, wherein for each question in the series that follows the first question, the determined probability value is one minus the previous probability value.

15. The medium of claim 14, wherein the running verification probability value determined for matching answers is a first numerical value divided by a second numerical value, the first numerical value being the probability that the first person would answer the question about themselves correctly multiplied times the previous probability value, the second numerical value being a product summed with the first numerical value, the product being the probability that the second person would answer the question about the first person correctly multiplied times the determined probability.

16. The medium of claim 15, wherein the running verification probability value determined for non-matching answers is a third numerical value divided by a fourth numerical value, the third numerical value being the probability that the first person would answer the question about themselves incorrectly multiplied times the previous probability value, the fourth numerical value being a product summed with the third numerical value, the product being the probability that the second person would answer the question about the first person incorrectly multiplied times the determined probability value.

17. A server for verifying on-line identities, the server comprising:
   a memory;
   a processor coupled to the memory, the processor execute instructions stored in the memory to:
      receive a request to perform an action;
      determine a series of questions based on a content of the request;
      receive a series of user answers to the series of questions;
      determine whether the series of user answers match a corresponding series of verification answers;
      determine a running verification probability value for the series of questions and user answers by:
         for each other-than-first question in the series with a matching answer, determining the running verification probability value based on a probability that a first person would answer a question about themselves correctly, a probability that a second person would answer the question about the first person correctly, a previous probability value from a previous question and answer in the series, and a determined probability value based on the previous probability value; and
         for each other-than-first question in the series with a non-matching answer, determining the running verification probability value based on a probability that the first person would answer the question about themselves incorrectly, a probability that the second person would answer the question about the first person incorrectly, the previous probability, and the determined probability value;
      determine whether the running verification probability value from a last question and answer in the series exceeds a threshold value; and
      verify an on-line identity when the running verification probability value from the last question exceeds the threshold value;
      allow subsequent on-line operations when the on-line identity has been verified; and
      prevent subsequent on-line operations until the on-line identity can be verified.

18. The server of claim 17, wherein the processor to further determine a risk level of the request based on the content of the request.

19. The server of claim 18, wherein the processor to further set the threshold value based on the risk level.

20. The server of claim 18, wherein the series of questions are based on the risk level.

21. The server of claim 20, wherein for the first question in the series of questions, the previous probability value and the determined probability value are a positive value less than one.

22. The server of claim 21, wherein for each question in the series that follows the first question, the determined probability value is one minus the previous probability value.

23. The server of claim 22, wherein the running verification probability value determined for matching answers is a first numerical value divided by a second numerical value, the first numerical value being the probability that the first person would answer the question about themselves correctly multiplied times the previous probability value, the second numerical value being a product summed with the first numerical value, the product being the probability that the second person would answer the question about the first person correctly multiplied times the determined probability.

24. The server of claim 22, wherein the running verification probability value determined for non-matching answers is a third numerical value divided by a fourth numerical value, the third numerical value being the probability that the first person would answer the question about themselves incorrectly multiplied times the previous probability value, the fourth numerical value being a product summed with the third numerical value, the product being the probability that the second person would answer the question about the first person incorrectly multiplied times the determined probability value.

* * * * *